(12) United States Patent
Peterson et al.

(10) Patent No.: US 8,920,073 B2
(45) Date of Patent: Dec. 30, 2014

(54) METHOD AND APPARATUS FOR REMEDIATING ORGANIC LOADING OF MARINE SEDIMENTS

(75) Inventors: Kevin Peterson, Stuart, FL (US); Alan Hart, Jupiter, FL (US); James Adamson, West Palm Beach, FL (US)

(73) Assignee: Continental Shelf Associates, Inc., Stuart, FL (US)

( * ) Notice: Subject to any disclaimer, the term of this patent is extended or adjusted under 35 U.S.C. 154(b) by 85 days.

(21) Appl. No.: 13/586,423

(22) Filed: Aug. 15, 2012

(65) Prior Publication Data

US 2013/0045053 A1    Feb. 21, 2013

Related U.S. Application Data

(60) Provisional application No. 61/524,052, filed on Aug. 16, 2011.

(51) Int. Cl.
*C02F 11/00* (2006.01)
*B09C 1/00* (2006.01)
*B09C 1/08* (2006.01)

(52) U.S. Cl.
CPC .. *B09C 1/002* (2013.01); *B09C 1/08* (2013.01)
USPC ............ 405/128.75; 405/128.15; 405/128.45; 405/128.5

(58) Field of Classification Search
USPC ................. 405/128.15, 128.45, 128.5, 128.7, 405/128.75
See application file for complete search history.

(56) References Cited

U.S. PATENT DOCUMENTS

| | | | | |
|---|---|---|---|---|
| 5,722,793 | A * | 3/1998 | Peterson | 405/164 |
| 6,517,287 | B2 * | 2/2003 | Zaiger | 405/128.25 |
| 6,558,081 | B2 * | 5/2003 | Hull | 405/157 |
| 7,115,203 | B2 * | 10/2006 | Hayes et al. | 210/747.4 |
| 2002/0039520 | A1 * | 4/2002 | Zaiger | 405/128.1 |
| 2002/0150429 | A1 * | 10/2002 | Hull | 405/129.2 |
| 2005/0067356 | A1 * | 3/2005 | Bowman et al. | 210/747 |
| 2005/0087499 | A1 * | 4/2005 | Hayes et al. | 210/747 |
| 2005/0268499 | A1 * | 12/2005 | Weinrib et al. | 37/326 |
| 2006/0027505 | A1 * | 2/2006 | Hayes et al. | 210/747 |
| 2008/0112761 | A1 * | 5/2008 | Sale et al. | 405/128.5 |
| 2008/0159812 | A1 * | 7/2008 | Joly | 405/128.7 |
| 2010/0189510 | A1 * | 7/2010 | Armstrong | 405/128.75 |
| 2012/0267320 | A1 * | 10/2012 | Baccigalopi | 210/747.5 |
| 2012/0318746 | A1 * | 12/2012 | Miller et al. | 210/747.5 |

* cited by examiner

*Primary Examiner* — Benjamin Fiorello
(74) *Attorney, Agent, or Firm* — Duane Morris LLP

(57) ABSTRACT

An apparatus comprises at least one cutting jet configured to inject a fluid into a first layer of soil below a surface layer of underwater soil in a first region. At least one soil extractor is configured to remove at least a portion of the injected fluid and a portion of the first layer of soil in the first region. A mixing manifold is provided for mixing the removed portion of the injected fluid and the removed portion of the first layer of soil. A discharge is provided for depositing the mixed fluid and soil over the surface layer of underwater soil.

11 Claims, 7 Drawing Sheets

METHOD AND APPARATUS FOR REMEDIATING ORGANIC LOADING OF MARINE SEDIMENTS

This application claims the benefit of U.S. Provisional Patent Application No. 61/524,052, filed Aug. 16, 2011, which is incorporated by reference herein in its entirety.

FIELD

This disclosure relates to marine tools, vehicles and methods.

BACKGROUND

There is a need to address the remediation of marine sediments that have been subjected to excessive loading with organic compounds. Organic loading may alter benthic communities by increasing sediment anoxia through microbial biodegradation. Instances of organic loading include the near vicinity to a seafloor oil spill and around sites where drill cuttings from non-aqueous based drilling mud systems have been discharged, or other organic materials have settled to the seafloor.

Remediation methods and equipment are desired.

SUMMARY

In some embodiments, a method comprises: identifying a region of underwater soil to be remediated; collecting soil from below a surface layer of the underwater soil in the region; and depositing the collected soil over the surface layer.

In some embodiments, an apparatus comprises: at least one cutting jet configured to inject a fluid into a first layer of soil below a surface layer of underwater soil in a first region; at least one soil extractor configured to remove at least a portion of the injected fluid and a portion of the first layer of soil in the first region; a mixing manifold for mixing the removed portion of the injected fluid and the removed portion of the first layer of soil; and a discharge for depositing the mixed fluid and soil over the surface layer of underwater soil.

In some embodiments, a method comprises identifying a region of underwater soil to be remediated; and injecting a fluid comprising water and oxygen into or below the surface layer of underwater soil in the region.

DETAILED DESCRIPTION

Figure 1:
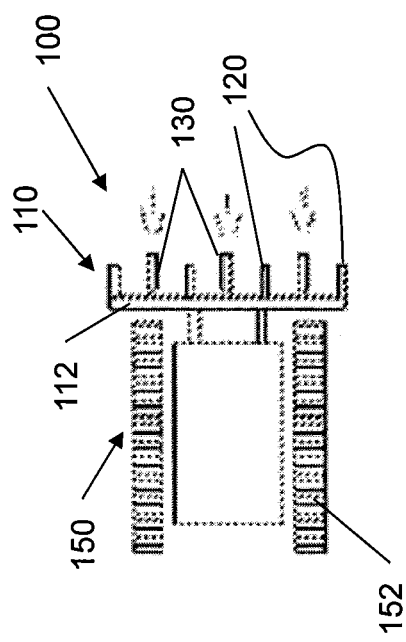
FIG. 1 is a top plan view of one embodiment.

This description of the exemplary embodiments is intended to be read in connection with the accompanying drawings, which are to be considered part of the entire written description. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. Unless expressly noted otherwise, like reference numerals appearing in multiple drawings indicate like items.

Given the problem, a concept that utilizes proven subsea technology and known scientific principles has been developed.

The marine sediment remediation (MSR) system and methodology described herein can accelerate the recovery rate of marine sediments from organic loading. The apparatus includes a mechanical delivery system that can be effectively used in shallow water and deep-water environments and that can be easily integrated with biological technology for biodegradation of organic compounds.

Some embodiments mechanically inject oxygenated water, and provide the option of injecting a formulation containing such things as nutrients and biodegradation bacteria seed or other elements into the sediments that have been contaminated. This injection will enhance and rejuvenate the biodegradation process with the consequence of reduced recovery time.

The method and apparatus can include components fabricated using existing technologies with off the shelf hardware. In other embodiments, one or more custom components and/or future developed components perform the functions described herein. The apparatus can utilize either purpose-built subsea host vehicles or existing vehicles of opportunity, such as remotely operated underwater vehicle (ROVs), Crawlers, Towed Vehicles, or the like. The system is flexible, providing a combination of one or more of the group consisting of mechanical, biological and/or chemical solutions to the problem.

In some embodiments, the system uses the option of a "mechanical overturning" of the damaged soil and/or injection of oxygenated water, a biological agent, a chemical agent or other elements at the appropriate time and position effectively accelerating the soil's recovery process. Non-limiting examples are described herein, but the optimal method can be adjusted at each site depending on the organic compound found, and the best combinations of mechanical, biological and chemical treatments. This "mechanical overturning" may be achieved by the use of a commercially available crawling or free flying remotely operated vehicle (ROV) or towed sleds for shallow water applications, as the host platform for the system.

In some embodiments, the MSR system includes a purpose-built suite of tools attached to a subsea host vehicle, including a jetting system and/or mechanical plow that can be configured in various ways to meet a wide range of soil conditions and sediment situations. The MSR system incorporates the ability to inject fluids into the soil and sediments to promote the remediation of marine sediments that have been subjected to contamination. These fluids may include water, biological agents, chemicals or a combination of these elements, depending on the contamination and other variables at the site.

In some embodiments, the "soil overturning" part of the system comprises water jets and/or mechanical implements to undercut the damaged soil below the layer of damage and removing deeper uncontaminated sediment as a slurry. These jets can be fed from the same source as the undercutting jets and educator jets (in embodiments using eductors). The slurry is pumped to discharge in a controlled manner over the top of the contaminated sediment. The sediment particles carried in this slurry will settle over the top of the contaminated sediment, effectively "overturning" the sediment. A biological or chemical agent could be injected into the covering slurry before discharging the slurry, or independently deposited before or after discharging the slurry, depending on the soil condition, type of chemical and/or biological agent and other pertinent factors.

FIGS. 1-4 show an embodiment of an apparatus 100 for marine sediment remediation. In some embodiments, the discharge orifices of the undercutting jets 120 are pointed in the direction of forward motion of the tool 110. The water jets ahead of the undercutting and removal legs, which help to clear the way for the undercutting legs 120 and removal legs 130 themselves.

The apparatus 100 includes a tool 110 having at least one cutting jet 120 configured to inject a fluid into a first layer 162 of soil below a surface layer 164 of underwater soil in a first region 161. The cutting jet 120 has one or more nozzles configured to inject a cutting stream of water capable of loosening the soil. The flow is directed in the direction of travel of the vehicle. Thus, the loosening effect of the injected water facilitates motion of the cutting jet devices 120 through the soil as the system 100 moves.

At least one soil extractor 130 is configured to remove at least a portion of the injected fluid 122 and a portion of the first layer 162 of soil in the first region 161.

A mixing manifold 112m is provided for mixing the removed portion of the injected fluid 122 and the removed portion of the first layer of soil. In some embodiments, the mixing manifold 112m is provided within the housing 112 of the tool 110.

In some embodiments, an effluent discharge 140 is provided for depositing the mixed fluid and soil 166 over the surface layer 164 of underwater soil.

The undercutting jets 120, soil removal legs 130, mixing manifold 112m and discharge 140 are formed of materials which are resistant to corrosion, such as aluminum, stainless steel, brass or bronze.

Figure 3:
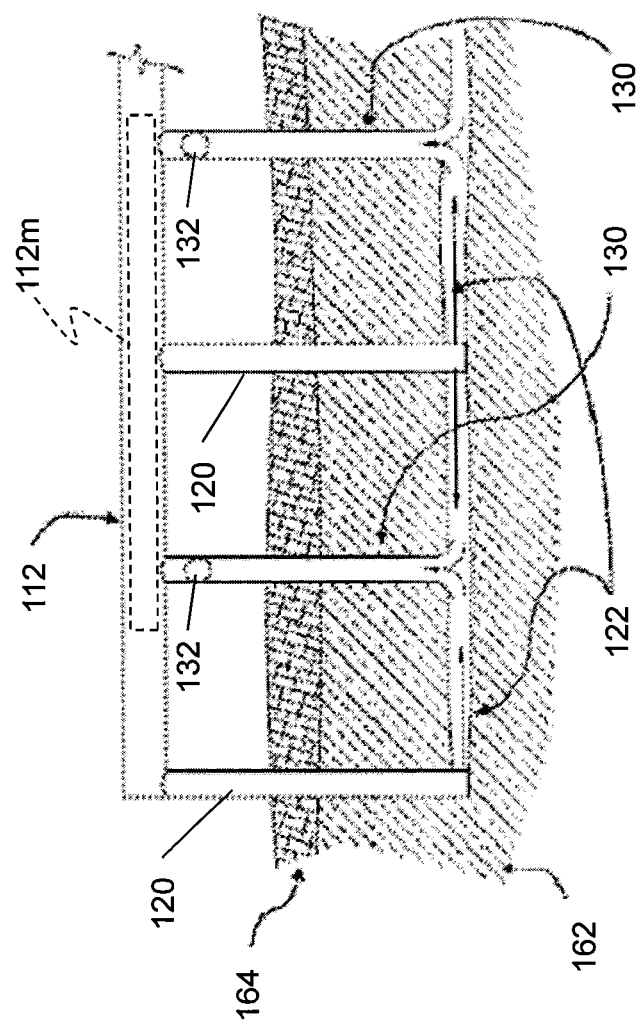
FIG. 3 is a front elevation view of the tool shown in FIG. 1.

FIGS. 1 and 3 show one example of an arrangement for the tool 110, in which the at least one cutting jet 120 includes a plurality of cutting jets 120, and the at least one soil extractor 130 includes a plurality of soil extractors 130. A single tool housing 112 contains the plurality of cutting jets 120 and the plurality of soil extractors 130, arranged in alternating sequence. As best seen in FIG. 3, in this arrangement, the fluid 122 is injected by two jets on opposite sides of a given removal leg 130, facilitating loosening of the soil and feeding of the soil into the removal leg.

Other arrangements can also be used. For example, instead of a single line of cutting jets 120 and removal legs 130, the tool 110 may have two or more rows of cutting jets 120 and removal legs. In one embodiment (not shown), the cutting jets 120 and removal legs 130 are arranged in a rectangular array, with the first member in each row alternating between a cutting jet 120 and a removal leg 130. Thus, within any row or column of the array, the cutting jets 120 and removal legs 130 alternate with each other.

A pump 182 is provided for pumping seawater to the cutting jet 120 to be used as the fluid 122. A conduit 171 is provided for conveying the seawater to the pump 182 from a second region that is separated from the surface layer of soil in the first region 161. In some cases, the de-oxygenated water only lies within a small volume immediately above the surface of the soil to be remediated. For example, the seawater intake can be located one to two meters above the "dead zone". In other embodiments, the seawater intake can be located near the surface of the sea.

In some embodiments, the seawater remote from the region 161 to be remediated contains sufficient oxygen for the treatment without adding oxygen from an external source. In other embodiments, additional air or oxygen is delivered to the apparatus 100 by an umbilical tube 173 connected to a surface supply 172. A pump 176 is provided for pumping ambient air or oxygen to a supply conduit 177 of the cutting jet(s) 120.

In some embodiments, a source of a chemical or biological agent includes a surface supply 172 or an onboard supply vessel 174. The pump 176 can also be used for pumping the chemical or biological agent to the mixing manifold 112m. A dosing control manifold 178 directs the flow from the pump 176 to the jetter supply line of cutting jet 120 and/or the mixing manifold 112m.

Figure 2:
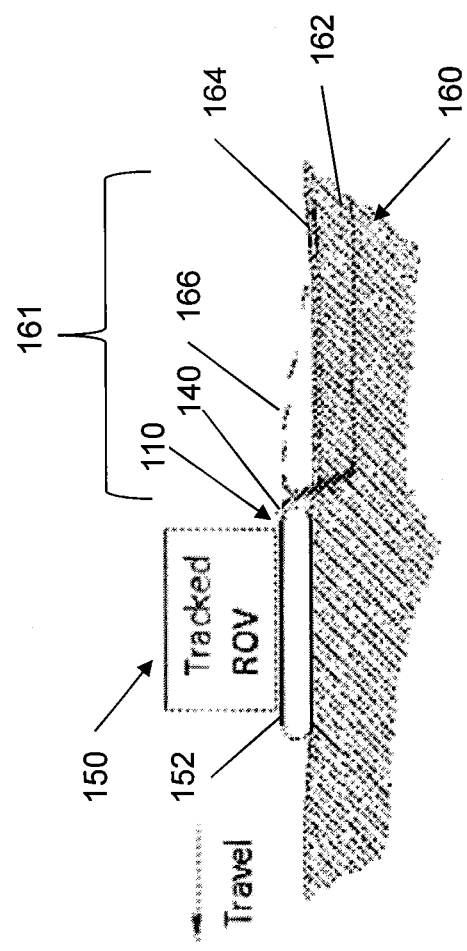
FIG. 2 is a side elevation view of the embodiment of FIG. 1.

As shown in FIGS. 2 and 3, a housing 112 is provided, supporting the cutting jets 120, the soil extractors 130, and the mixing manifold 112. The example of FIG. 1 has a generally comb (or rake) shaped configuration, suitable for injecting fluid from the cutting jets 120 into the soil and for removing soil and fluid using removal legs 130 with eductors 132 or vacuum pump or the like. In other embodiments the tool 110 is adapted for mechanical plowing, and includes a different configuration, such as a mechanical cutting blade configured to overturn the soil. In the example of FIG. 2, the discharge 140 is provided at the rear of tool 110, relative to the direction of travel of the vehicle. Locating the discharge 140 in the rear can result in a more controlled and uniform deposition of the aerated soil on the sea floor. A suitable conduit can be used to convey the aerated soil/water slurry from the mixing manifold to the discharge 140.

In FIGS. 1 and 2, the tool 110 is integrated as a part of a remotely operated underwater vehicle (ROV) 150, such as a ROV having tracks 152 for crawling along the sea floor 160.

Figure 6:
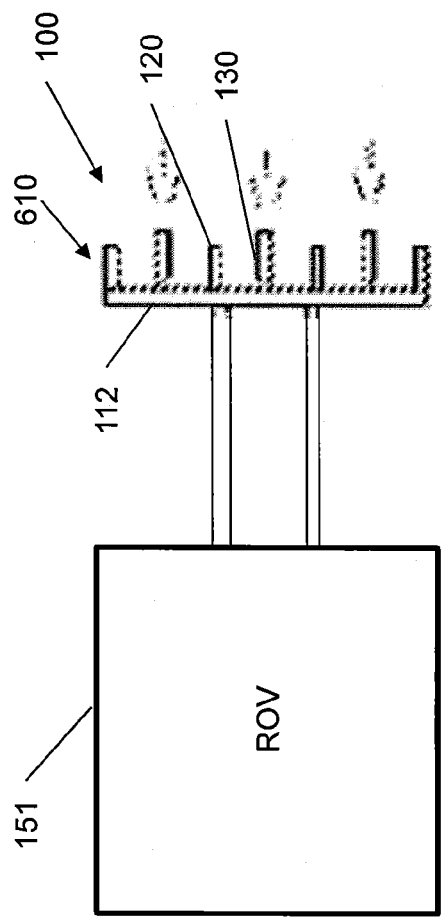
FIG. 6 is a top plan view of a variation of the apparatus of FIG. 1.

In certain water depths, and for specific applications, a towed vehicle or a plough may also be used to deploy the MSR system 100. In some embodiments, as shown in FIG. 6, the tool 610 is a separate payload, which is connected to an ROV 151. This allows the use of any ROV 151 to tow the housing 112 containing the cutting jets 120, the soil extractors 130, the mixing manifold 112m and the discharge 140. The ROV 151 can be a free-flying ROV or a tracked ROV configured for crawling along the sea floor. In some embodiments, the ROV 151 provides electrical power to the tool 610. In other embodiments, tool 610 has its own internal power source (e.g., battery), or power can be provided from a marine surface power source to the tool 610.

In some embodiments the supply of chemical or biological agents may be provided through a pipe or hose from the surface. This pipe or hose could be part of the umbilical system 192 to the vehicle 150, 151 or a separate line between the vehicle and the surface.

The towed system may be more efficient and cost effective to deploy in some applications and may have the added advantage of even greater payloads. By their very designs, towed systems also offer greater mechanical interaction with the seafloor, for applications that use additional mechanical force to effect the seafloor. Examples of these towed systems would include Soil Machine Dynamics towed ploughs OT 400 to QT 1400 series, and a variety of other towed systems produce from cable and pipeline systems.

Figure 7:
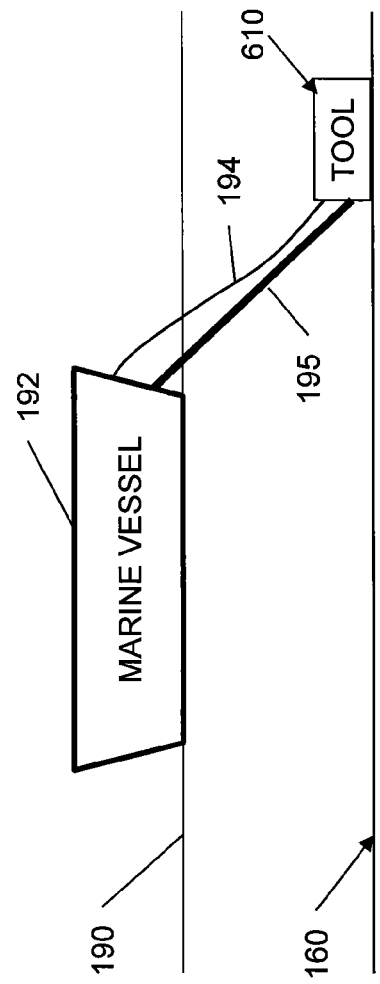
FIG. 7 is a side elevation view of another variation of the apparatus of FIG. 1.

In other embodiments, as shown in FIG. 7, the tool 610 is directly connected by an umbilical cord 194 to a marine vessel 192, such as a boat on the surface 190 of the sea, or a submarine. The umbilical tube 194 provides power and, optionally, oxygen and/or chemical and/or biological agent.

The marine surface vehicle 192 or submarine is connected to the housing 112 of the tool 610 to tow the tool. A separate towing chain or member 195 can provide the mechanical connection to facilitate towing without straining or damaging the umbilical tube 194.

As shown in FIG. 3, in some embodiments, the at least one soil extractor includes at least one eductor jet 132. An eductor 132 uses the venturi effect of a converging-diverging nozzle (e.g., in the direction flowing into or out of the page in FIG. 3) to create a low pressure zone beneath the venturi. This low pressure zone draws in and entrains a suction fluid to remove the mixture of the injected fluid and soil from the layer 162 into the tool 110/610. In some embodiments, as shown in FIG. 1, each eductor leg 130 has a respective discharge, comprising the outlet of the respective venturi of its respective eductor 132. In other embodiments, the fluid and soil are mixed with a chemical and/or biological agent in mixing manifold 112m and discharged through a common effluent discharge 140 (FIG. 4), which may have a single discharge nozzle, or a plurality of discharge nozzles (and may be located in the rear of the tool 110).

Figure 4:
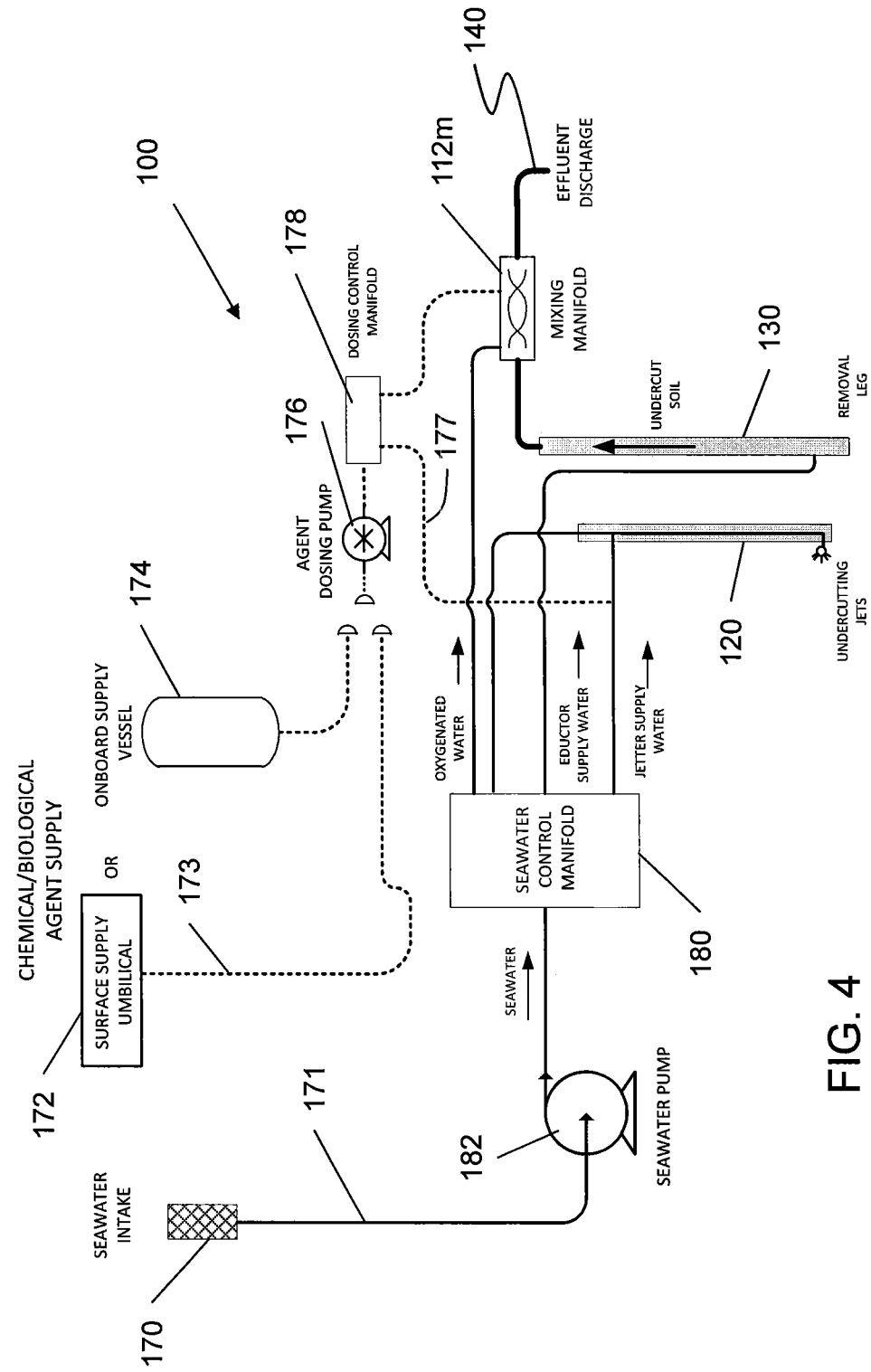
FIG. 4 is a schematic block diagram of the apparatus of FIG. 1.
Figure 5:
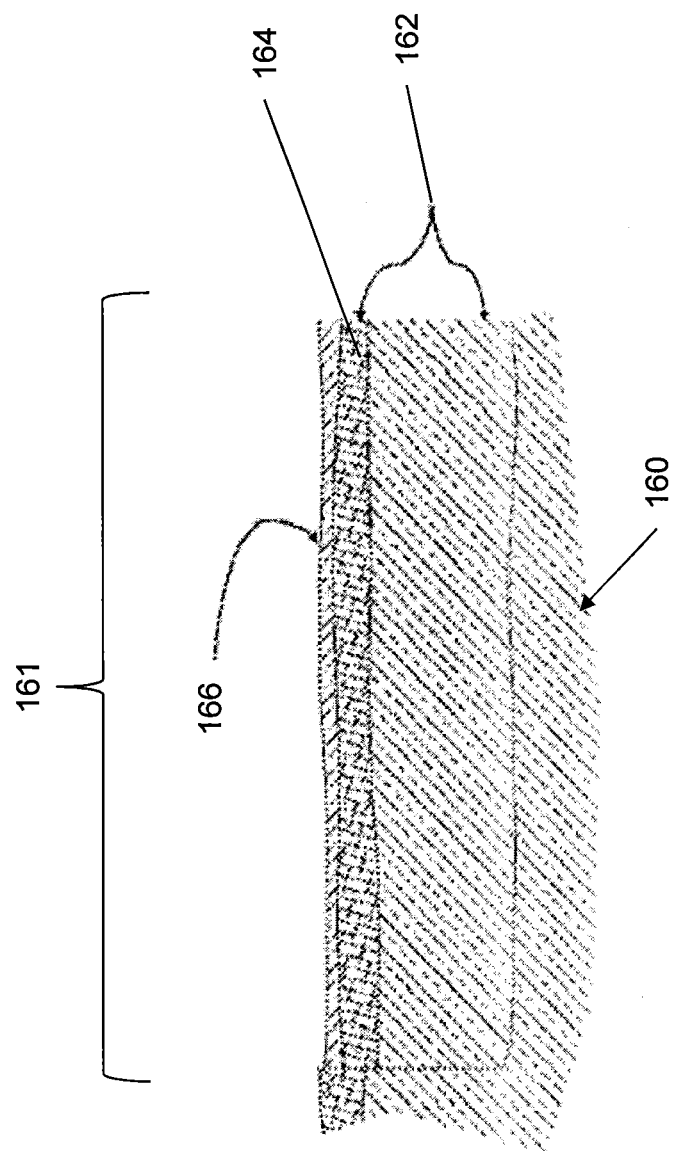
FIG. 5 is a side cross-sectional view of a region after remediation using the apparatus of FIG. 1.

FIG. 4 shows the primary components of the MSR system. Other components, such as connecting conduits and cables, and simple mechanical hardware for mounting and supporting these component are not shown. One of ordinary skill in the art can readily select the appropriate mounting hardware, plumbing and cabling for any given configuration.

The high volume seawater pump 182 provides pressure and flow to the seawater control manifold 180 to operate the undercutting jets 120, eductor supply water for soil removal, and injection of oxygenated seawater into the cutting jets 120 and, optionally, to the mixing manifold 112m. The seawater pump 182 may be provided by the host vehicle, such as trenching ROV's 150 (FIGS. 1-2) or provided in the work tool 610 for adaptation to a smaller free flying ROV 151 (FIG. 6), or by a marine surface vehicle 192 (FIG. 7).

In some embodiments, the seawater control manifold 180 contains the electro/hydraulic valves (not shown) to control the seawater pressure and flow to the undercutting jets 120, soil removal legs 130, and oxygenated water injectors. Electronic flow and pressure sensors (not shown) are used to monitor the pressure and flow to allow the operator to adjust the operation as appropriate from the surface using the control system.

The Chemical or Biological agent is provided to the agent dosing pump 176 from an onboard pressure compensated supply vessel 174, or a surface supply umbilical 173, depending on the volume of agent to be used and type of vehicle utilized. The dosing pump 176 supplies pressure and flow to the dosing control manifold 178, which meters the supply of the chemical and/or biological agent to the mixing manifold 112m.

The dosing control manifold 178 contains electro/hydraulic metering valves (not shown) to control the source of injection (undercutting jets 120 or effluent discharge 140) and the rate of the agent dispersal. Electronic flow and pressure sensors (not shown) are used to monitor the pressure and flow to allow the operator to adjust the operation as appropriate from the surface using the control system.

Although an ROV 150 can be specially designed to integrally include the tool 110, a variety of existing Remotely Operated Vehicles (ROVs) 151 may be utilized to deploy the tool 610 of the MSR, which tool 610 can be fabricated and/or purchased separately from the ROV 151. There are three basic types of ROV 151, with a range of capabilities in each category.

Free Flying ROVs

The MSR system 100 may be deployed by commercially available "free flying" work ROVs 151, such as the TRITON systems produce by Perry Slingsby Systems, Inc. of York, UK, the HD and UHD ROVs produced by Schilling Robotics, Davis, Calif., Millennium ROVs produced by Oceaneering, International of Houston, Tex., or a variety of other work ROVs produced by companies such as Soil Machine Dynamics of Newcastle upon Tyne, England and other international manufacturers. These free swimming or free flying ROV 151 can be used to deploy the MSR systems to the sea floor, providing hydraulic, electrical and high/low pressure water to the system. Other hybrid free flying vehicles also carry tracks or wheels, allowing the system to crawl along the sea floor. In either case, the ROV 151 can be outfitted with the tool 110 or 610, including the jetting system and other tools to facilitate the "overturning" of the sea floor and the injection of oxygenated water, biological agents, chemical agents or other elements appropriate for the application. These free flying systems may be utilized for smaller projects, or projects that do not require large quantities of biological or chemical agents.

Tracked or Wheeled ROVs and Trenchers

For larger projects, ROV Trenchers 151 may be more appropriate due to the increased level of power and payload capability. Numerous commercially available ROV Trenchers 151 would be adequate to deploy the tool 610 of the MSR system. Example systems would be the XT300 to XT1200 line of trenchers produced by Perry Slingsby/Forum and the Soil Machine Dynamics Trenchers produced for cable and pipeline trenching. These trenchers can range in power from 200 hp to well over 1000 hp, with some vehicles weighing over 30,000 KG. A Trencher or bottom crawling vehicle can deploy larger mechanical tools and higher volumes of chemical and biological agents, thereby allowing the MSR 100 to cover larger areas without the need to return to the surface.

Chemical and Biological Agents

Various embodiments of the MSR system 100 can include a variety of biological organisms and chemical compounds, to be injected for the purpose of accelerating the biodegradation and bioremediation processes. Biodegrading biological microorganisms include naturally occurring and genetically engineered bacteria, fungi (yeast) and plants in the appropriate circumstances. Bacteria that are capable of biodegrading organic compounds include *Achromobacter, Acinetobacter, Alcaligenes, Arthrobacter, Bacillus, Brevibacterium, Corynebacterium, Flavobacterium, Nocardia, Pseudimonas*, and *Vibrio*. Fungi include *Aspergillus, Candida, Cladosporium, Penicillium, Rhodotorula, Sporobolomyces*, and *Trichoderma*, and products such as B12Yeast. Examples of suitable chemical agents include fertilizers containing nitrogen and phosphorus, enzymes, emulsified vegetable oil, and stabilizing agents.

Figure 8:
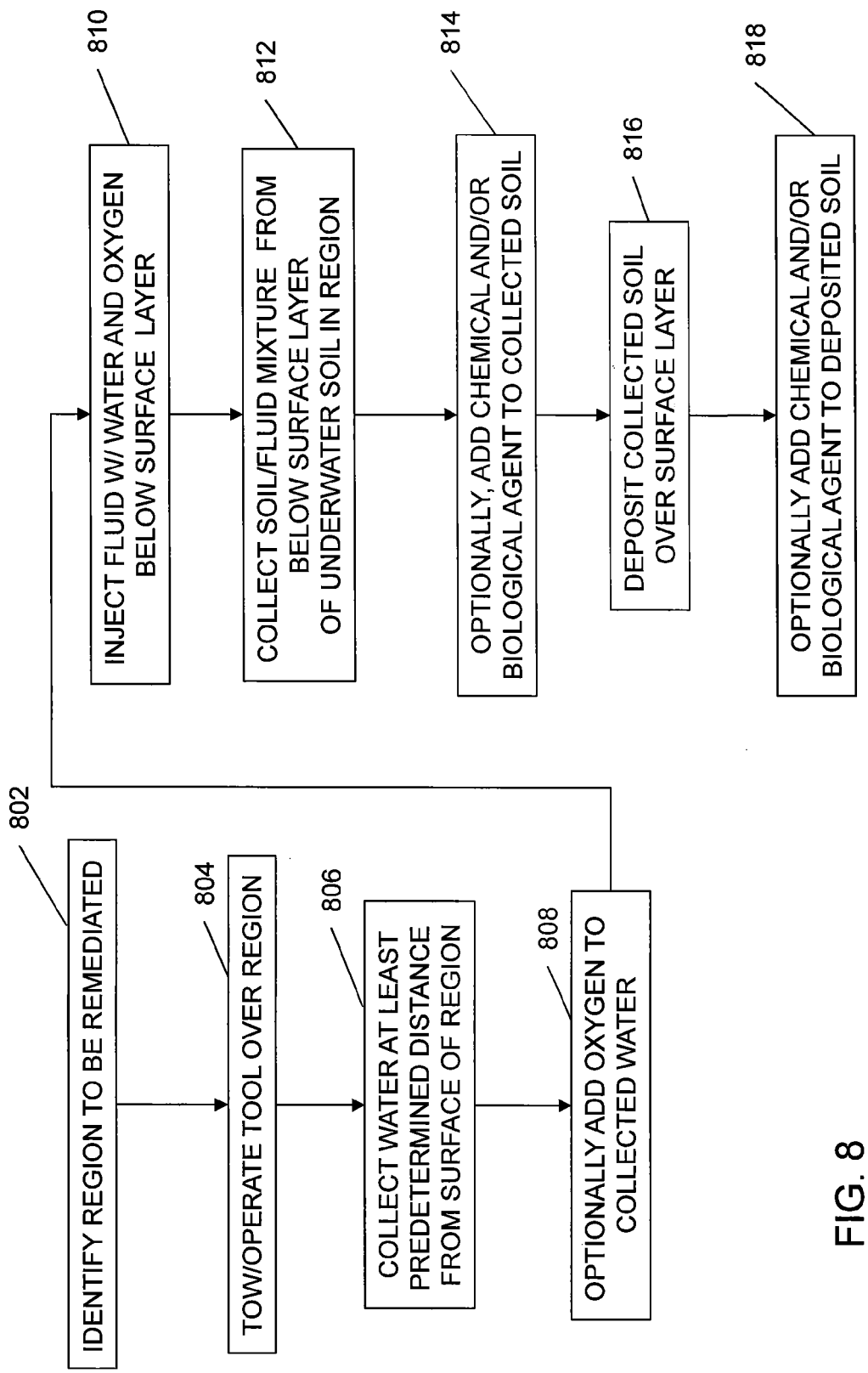
FIG. 8 is a flow chart of an embodiment of a method using the apparatus of FIG. 1.

FIG. 8 is a flow chart showing a method for soil

At step 802, a region of underwater soil is identified to be remediated.

At step 804, the integrated tool 110 or towed tool 610 is deployed over the region of soil to be remediated. The deploying step may include driving a free-flying, tracking or hybrid ROV to the region, or towing the tool 610 to the site by an ROV or marine surface vehicle.

At step 806, oxygenated seawater is supplied or collected at least a predetermined distance away from the surface of the region. The collected oxygenated seawater is to be used as the fluid.

At step 808, oxygen from an oxygen supply is optionally mixed into the collected seawater.

At step 810, a fluid comprising water and oxygen is injected below the surface layer of underwater soil in the region.

At step 812, soil is collected from below a surface layer of the underwater soil in the region. In some embodiments, the soil collecting step includes collecting a mixture of the soil and the fluid.

At step 814, optionally, a chemical agent and/or a biological agent is added to the collected soil.

At step 815, the collected soil is deposited over the surface layer. In some embodiments, the soil and oxygenated water are mixed within a mixing manifold, with the optional addition of a chemical and/or biological agent.

In other embodiments, the collecting and depositing are both performed by plowing the underwater soil in the region. For example, a plow blade can be arranged behind the water injection jets. The plow blade can further loosen and lift the soil, turn over the soil, and release the inverted soil onto the sea floor.

At step 818, optionally, in some embodiments, a chemical agent and/or a biological agent is deposited over the deposited soil. This step can be performed in a particular set of conditions, if it is determined that a surface deposition is advantageous relative to mixing.

In some situations it may be desirable to inject oxygenated water and/or various agents into the soil without collecting soil from below the surface and depositing it on the surface layer. For example, in such situations, it may be desirable to mix the fluid solution into the soil without overturning, exchanging or moving the layers. The dosing manifold control 178 facilitates pumping solution into the undercutting jets 120 as well as the mixing manifold 112m/soil extractor 130.

Figure 9:
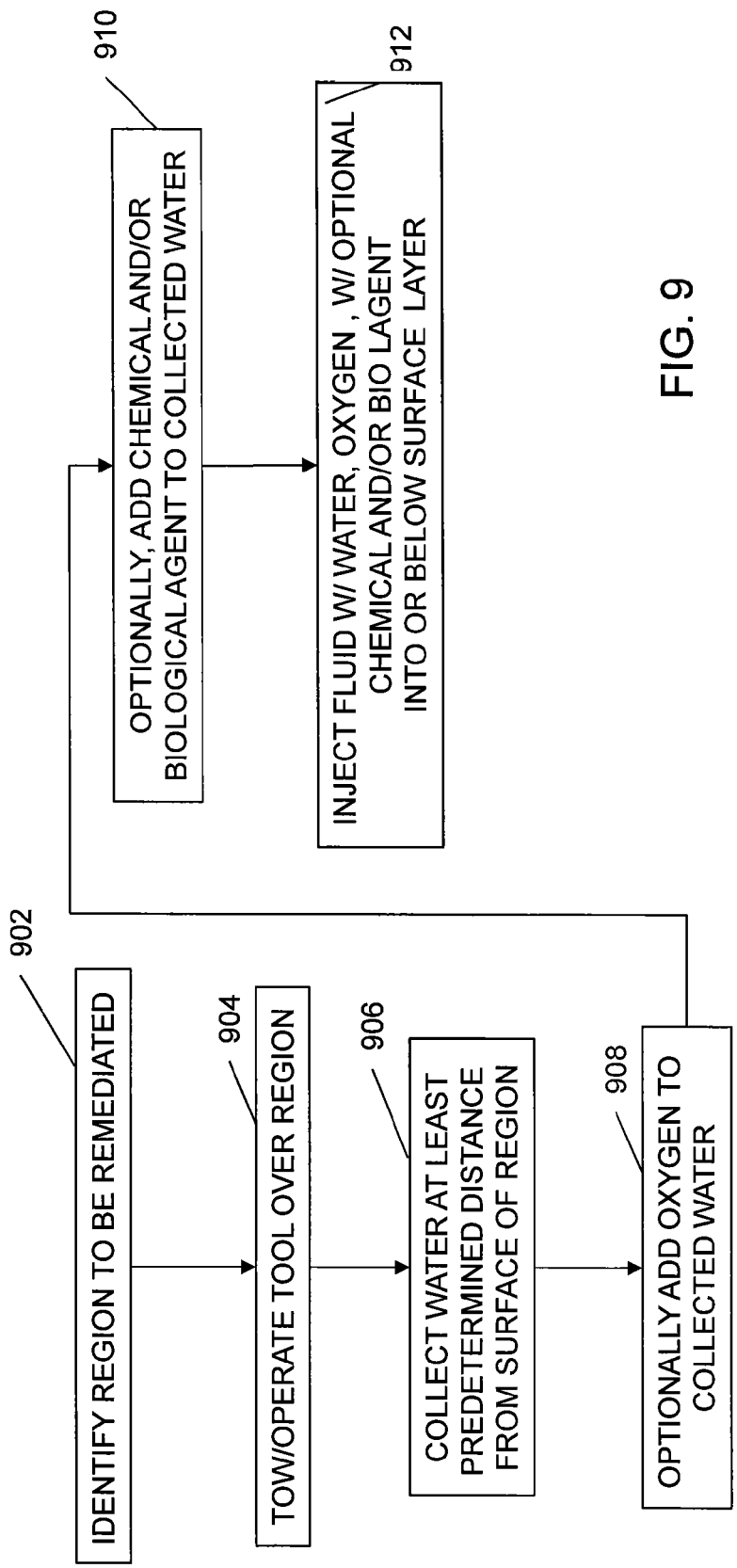
FIG. 9 is a flow chart of an embodiment including injecting fluid into or below a surface layer of the underwater soil.

FIG. 9 is a flow chart of a method in which the soil is not substantially overturned.

At step 902, a region of underwater soil is identified to be remediated.

At step 904, the integrated tool 110 or towed tool 610 is deployed over the region of soil to be remediated. The deploying step may include driving a free-flying, tracking or hybrid ROV to the region, or towing the tool 610 to the site by an ROV or marine surface vehicle.

At step 906, oxygenated seawater is supplied or collected at least a predetermined distance away from the surface of the region. The collected oxygenated seawater is to be used as the fluid.

At step 908, oxygen from an oxygen supply is optionally mixed into the collected seawater.

At step 910, a chemical and/or biological agent is optionally added to the collected water.

At step 912, a fluid containing the oxygenated water, and optionally the chemical and/or biological agent, is injected into or below the surface of the underwater soil.

In this scenario the undercutting jets 120 inject and mix the solution into the surface layer 164 or sub-layer 162 of the soil, or both, but not overturn or significantly exchange one layer for another. The apparatus 100 of FIG. 1 has the ability and flexibility to control flow to the undercutting jets 120 and the soil extractor 130, in combination with the ability to inject the chemical and/or biological agent into either layer.

Although the general concepts are described herein, various jetter configurations may be used depending on actual soil conditions and sediment characterizations. One of ordinary skill in the art can readily employ variations or adaptations of this method tailored for a particular purpose, such as soft cohesive soils, sandy soils, and hard clays.

Although the subject matter has been described in terms of exemplary embodiments, it is not limited thereto. Rather, the appended claims should be construed broadly, to include other variants and embodiments, which may be made by those skilled in the art.

What is claimed is:

1. A method comprising:
    identifying a region of underwater soil to be remediated;
    injecting a fluid containing at least one of oxygen and nutrients, below a surface layer of the underwater soil in the region;
    collecting a mixture of the underwater soil and said fluid, from below said surface layer of the underwater soil in the region; and
    depositing the mixture of the underwater soil and said fluid, over the surface layer.

2. The method of claim 1, wherein said injecting of the fluid comprises pumping the fluid to emerge below the surface layer through a conduit drawn along a plowing path through the region; said collecting of the mixture comprises entraining the mixture by suction applied below the surface layer, into an eductor jet; and, said depositing over the surface layer includes discharging the mixture collected by the eductor jet.

3. The method of claim 2, further comprising additionally adding at least one of a chemical agent and a biological agent to the collected soil.

4. The method of claim 2, wherein the fluid comprises seawater collected at least a predetermined distance away from the surface of the region such that the seawater is oxygenated, and wherein a flow of seawater for said injecting and a flow of seawater producing suction by the eductor jet are driven by at least one seawater pump carried by a subsurface device.

5. The method of claim 2, wherein the fluid comprises collected seawater; further comprising mixing one of oxygenated water and oxygen from an oxygen supply into the collected seawater; and wherein a flow of the collected seawater for said injecting and a flow of seawater producing suction by the eductor jet are driven by at least one subsurface seawater pump.

6. The method of claim 2, wherein said injecting and said collecting comprise establishing flow in conduits having one of a rake and comb configuration, while drawing said configuration through the underwater soil in the region.

7. The method of claim 1, further comprising adding at least one of the group consisting of a chemical agent and a biological agent to the deposited soil.

8. The method of claim 1, wherein the collecting and depositing steps are performed by a remotely operated underwater vehicle (ROV).

9. The method of claim 1, further comprising towing an apparatus configured to perform the soil collecting and depositing steps.

10. The method of claim 9, wherein the towing step is performed by a remotely operated underwater vehicle (ROV).

11. The method of claim 9, wherein the towing step is performed by a surface vessel.

* * * * *